United States Patent [19]

Pitner

[11] 3,950,834
[45] Apr. 20, 1976

[54] PROCESS FOR PROVIDING BEARING SURFACES ON TRUNNIONS OF A UNIVERSAL JOINT

[75] Inventor: Alfred Pitner, Paris, France

[73] Assignee: Nadella, France; a part interest

[22] Filed: May 23, 1974

[21] Appl. No.: 472,703

[30] Foreign Application Priority Data
May 25, 1973 France .............................. 73.19156

[52] U.S. Cl. ............................ 29/149.5 R; 29/434; 308/163; 64/17 R
[51] Int. Cl.² ........................................ B21D 53/10
[58] Field of Search ....................... 29/149.5 B, 434; 308/212, DIG. 3, 163; 64/17 R

[56] References Cited
UNITED STATES PATENTS

| 3,036,366 | 5/1962 | Ricks | 29/149.5 B |
|---|---|---|---|
| 3,178,907 | 4/1965 | Lyons | 29/434 |
| 3,290,754 | 12/1966 | Pitner | 29/434 |
| 3,434,196 | 3/1969 | Lavengood | 29/437 |
| 3,492,710 | 2/1970 | Pitner | 29/434 |
| 3,552,811 | 1/1971 | Kayser | 308/212 X |
| 3,644,973 | 2/1972 | Abe | 29/149.5 B |

Primary Examiner—C. W. Lanham
Assistant Examiner—V. K. Rising
Attorney, Agent, or Firm—Robert E. Burns; Emmanuel J. Lobato; Bruce L. Adams

[57] ABSTRACT

To produce on at least one of the end faces of opposed trunnions of the cross member of a universal joint a bearing surface for the end wall of a bearing cup, or for a resilient washer interposed between the cup end wall and the trunnion, there is chosen for the distance between the centre of the cross member and the centre region of the end face a value which is different from the value of the desired distance in joint operation. This centre region is then subjected to the action of a tool whose hardness exceeds that of the metal of the trunnion by causing the tool to travel such distance that the active surface of the tool occupies a position in which there is formed, by a cold upsetting of the metal, a centre bearing surface which is at a distance from a reference point, such as the centre of the cross member, which is substantially equal to the desired value of the distance in joint operation.

10 Claims, 7 Drawing Figures

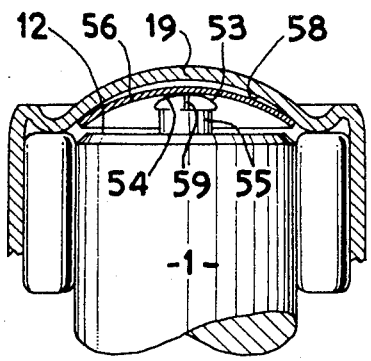
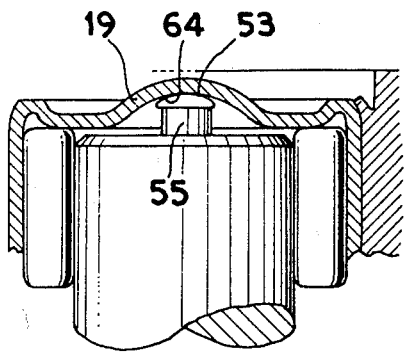
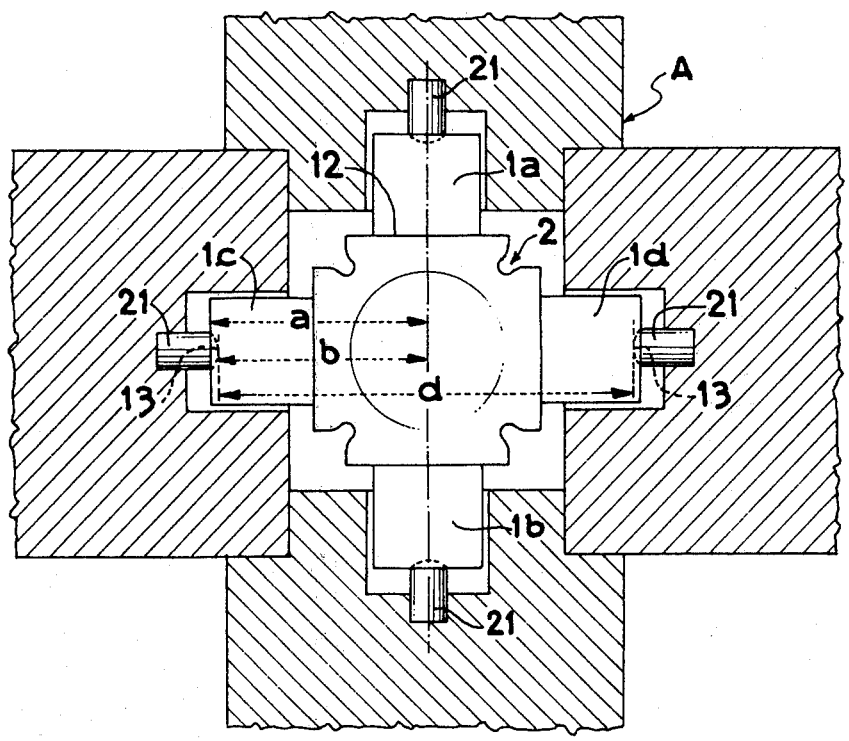

PROCESS FOR PROVIDING BEARING SURFACES ON TRUNNIONS OF A UNIVERSAL JOINT

The present invention relates to universal joints comprising two yokes and a cross member whose four trunnions are each capped by a cup constituting a bearing, preferably of the needle bearing type, which is maintained in the corresponding bore of the yoke.

In such universal joints, the centering of the cross member with respect to the yoke, and consequently of a yoke with respect to the other yoke, may be ensured by means of thrust rings which also constitute sealing elements and are disposed between a flange which is part of the cups and a shoulder of the trunnions of the cross member, the end face of a trunnion remaining out of contact with the end wall of the cup which, in the event of displacement of the cross member with respect to the yoke in the course of operation, may create a cyclic compression of the elastically yieldable means which is then deformed by crushing which may in some cases adversely affect its sealing effect.

The centering may also be achieved in a conventional manner by the contact of the end wall of the needle cup with the end face of the corresponding trunnion. This contact of course affords a more rigid centering than the first-mentioned arrangement which may create in the course of the positioning of the needle cups in the yokes, an excessive compression of the sealing ring provided, as in the first-mentioned arrangement, between a flange of the cup and a shoulder of the trunnion, owing to the effect of the tolerances on the position of the shoulder, there then being a risk that the efficiency of this ring be adversely affected.

If there is ensured a contact between the end wall of the cup and the end of the trunnion, a cheap machining of the end faces carried out with wide tolerances cannot be employed, since the cross-member must be maintained in position without substantial play since a residual play would render the centering unprecise and could result in tapping noises during joint operation and also in poor effectiveness of the sealing element. On the other hand, an excessively tight assembly would imply an unacceptable fatigue of the parts in contact under excessive stress and friction which does not permit a journalling under low torque — necessary in respect of universal joints rotating at high speed or universal joints employed in remote controls which must be smooth and even in operation, as, for example, the control of the steering angle of vehicle wheels by the force exerted by the driver on a steering wheel.

A solution has already been proposed in which the end face of at least one of two opposed trunnions bears against the end wall of the needle cup through a thrust member of plastics material which is fitted in a cavity machined in the centre of the face of the trunnion.

This thrust member has the required hardness and resistance but, due to its very nature, it may result in aging phenomena which are difficult to control and are in certain cases unacceptable for safety parts employed in automobile construction.

It has also been proposed to introduce between the end wall of the needle cup and the end face of the trunnion an elastically-yieldable washer of such shape that there is created a slight axial prestressing intended to preclude any tapping which could appear owing to the accumulative effect of the tolerances in the various parts, namely. trunnion, washer, end wall of the cup. This accumulation may result in relatively large clearances. This washer bears against the end face of the trunnion which must therefore be machined with precision if the aforementioned drawbacks are to be avoided.

The present invention approaches the problem by means of an assembly which employs, in the course of manufacture of the parts, easily-produced centering means so that it is possible to avoid machining by removal of material, such as machining on a lathe and/or above all a grinding of the end surface of the trunnions of the cross member of the universal joint, or even a part of this end face.

More precisely, an object of the invention is to provide a process for producing on at least one of the end faces of the trunnions of a cross member of a universal joint a bearing surface for the end wall of a bearing cup, for example a needle bearing cup, or for an elastically-yieldable washer which bears against the end wall, wherein there is chosen for the distance between the centre of the cross member and the centre region of the end face of the trunnion a value which is different from, and preferably greater than, the desired distance in joint operation, and this centre region is subjected to the action of a tool of a press or the like, which tool is of a metal whose hardness is distinctly higher than that of the metal of the trunnion, by imparting to the tool a travel whose extent is such that at the end of the travel, the active surface of the tool occupies a position for which position there is formed, by a cold upsetting of the metal, a centre bearing surface at a distance from a reference point, which is for example the centre of the cross member, substantially equal to the desired distance in joint operation.

The bearing surfaces of the four trunnions may be produced separately but it will be understood that it is preferred to produce in a single operation bearing surfaces on two opposed trunnions or, better still, simultaneously on all the trunnions. In any case it is possible in applying the proposed process to obtain a very precise assembly of the cup capping the trunnions.

To facilitate the deformation of the metal of the trunnions, it is clear that the forming of the bearing surfaces must be carried out before the final heat treatment of the trunnions.

An advantage of the deformation of the metal to provide the bearing surfaces is that it locally increases the compactness of the material and consequently produces a particularly advantageous surface condition. In respect of the quality of the surface condition, it is also necessary that the active surface of the tool or tools also have a suitable quality. A tool in the form of a ball could advantageously satisfy this condition. In this case, the bearing surface obtained has the form of a spherical dome hollowed out in the trunnion. It is also possible to facilitate the sliding of the bearing surface on the surface it receives by the impression of a local relief adapted for this purpose. This relief is advantageously produced by lubricant-retaining grooves or recesses.

With this spherical surface there may co-operate either the centre part of the end wall of the cup shaped for this purpose, or a centre bulge of a resiliently-yieldable washer which is interposed between the end wall of the cup and the end surface of the trunnion, the peripheral part of the washer bearing against an annular surface on the end wall of the cup.

It is also possible to give the active surface of the tool or tools a concave shape, in which case the bearing surface is formed on the end of a centre part projecting from the end face of the trunnion, advantageously in the form of a spigot or stud which is an integral part of the cross member. The convex bearing surface is then applied either against a concave dome at the end of the cup or against the concave surface of a resiliently-yieldable washer whose convex surface bears against an inner curved surface of the end wall of the cup.

The active surface of the tool or of each tool may also be planar.

The washer which may be employed may be under certain conditions partially hollowed out so as to increase its resilient qualities and facilitate its operation as a spring working under flexion between the end wall of the needle cup against which it bears through its periphery and the end face of the trunnion.

As it is prestressed, the resiliently-yieldable washer precludes any tapping in operation of the universal joint. It may also serve as a reinforcement for the end wall of the cup and permit an excellent electrical connection between the universal joint in which it is incorporated and the adjacent part of a steering column which is of particular utility for the return of electric current of horns or other accessories.

Embodiments of the invention will now be described in the ensuing description by way of example with reference to the accompanying drawings in which:

FIGS. 2 to 6 are sectional views of modifications of the structure shown in FIG. 1, and FIG. 7 is a diagrammatic view of a press for producing the bearing surfaces for the structures shown in FIGS. 1 to 6 either directly for the end wall of the cup or for a resiliently-yieldable washer interposed between this end wall and the trunnion.

Figure 1:
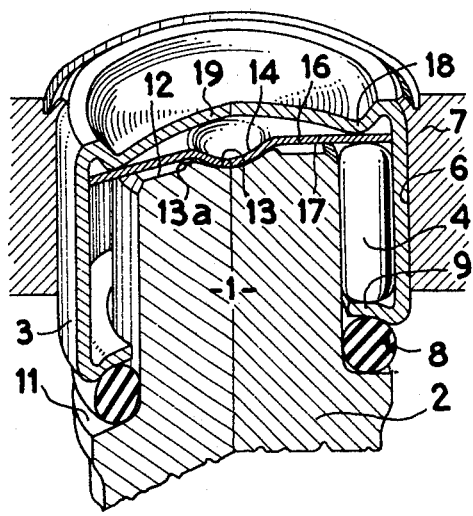
FIG. 1 is a perspective view, with a part cut away, of a needle cup engaged in a bore in a universal joint yoke, the cup capping a trunnion of the cross member and a washer being interposed between the end face of the trunnion and the end wall of the cup.

In FIG. 1 the trunnion 1 of a cross member 2 of a universal joint is capped by a cup of cold-formed sheet metal 3 enclosing needles 4 and engaged and retained in the bore 6 of the yoke 7 of the universal joint. The cup is sealed by an elastomeric O-ring 8 which is axially compressed between a radial flange 9 of the cup and a shoulder 11 of the trunnion. The centre part of the end face 12 of the trunnion 1 constitutes a concave bearing surface 13 having a generally-spherical shape against which bears the centre part, defining a convex projection 14, of a resiliently-yieldable washer 16 which includes around the projection 14 a planar part 17 which bears against an annular ridge 18 on the end wall 19 of the cup. The bearing surface 13 is produced by a cold deformation of the material under the action of a very hard tool which produces, on the periphery of the bearing surface 13 an annular beading 13a by upsetting the metal.

Figure 2:
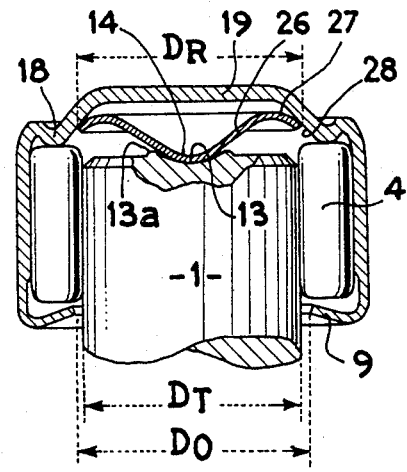

In FIG. 2 the washer 26 has around the projection 14 a peripheral portion 27 having a generally toric shape which bears against a frustoconical side portion 28 surrounding the planar centre portion of the end wall 19 of the cup. The diameter $D_R$ of the washer 26 exceeds the diameter $D_T$ of the trunnion 1 but is less than the diameter $D_O$ of the opening of the cup defined by the free edge of the radial flange 9. This arrangement permits the introduction of the washer 26 in the cup before the needles 4 are placed in position and the retention of the washer in the cup provided with its needles which are retained by the effect of grease.

Figure 3:
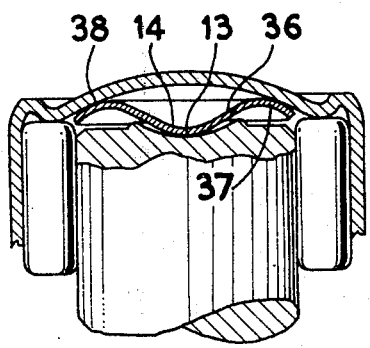

The washer 36 shown in FIG. 3 is flatter than the washer 26 shown in FIG. 2 and has in the same way as the washer 26 a toric edge portion 37 which bears against the concave inner surface 38 of the dome-shaped centre region of the end wall 19 of the cup.

Figure 4:
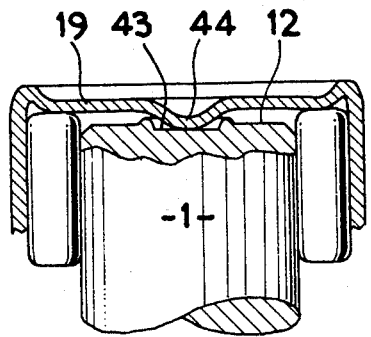

In FIG. 4, the bearing surface 43 defines in the end face 12 of the trunnion 1 a depression having a flat end surface against which bears directly a centre part, in the form of a convex projection 44, of the cup end wall 19 whose general shape is planar.

In FIG. 5, the bearing surface is constituted by the convex end surface 53 of a spigot 55 which projects from the centre of the end face 12 of the trunnion 1 and is an integral part of the latter. Bearing against the bearing surface 53, which includes lubricating grooves 59 arranged in the shape of a cross, is the centre part 54 of the concave inner surface of a resiliently-yieldable washer 56 whose convex outer surface bears against the concave inner surface 58 of the dome-shaped end wall 19 of the cup.

FIG. 6 shows a modification of the structure shown in FIG. 5 in which the convex end surface 53 of the spigot 55 bears directly against the curved centre portion 64 of the end wall 19 of the cup.

It will be understood that the described and illustrated cold-formed cups may be replaced by machined massive cups of the type employed conventionally in universal joints.

FIG. 7 shows diagrammatically a press A whereby it is possible to form with all the desired precision the bearing surfaces, such as the surface 13 shown in FIGS. 1 to 3, in the end faces 12 of the four trunnions $1a$, $1b$, $1c$, $1d$ of the cross member 2.

The rough forged member constituting the blank of the cross member is so calibrated that the distance a between the centre O of the cross member and the planar end face 12 of the trunnions exceeds the final desired distance $b$ between the centre 0 and the centre of the bearing surface 13 to be obtained.

The cross member blank is disposed in the centre of the press A in such position that the four movable press tools 21 which have a rectilinear movement are roughly coaxial with the respective trunnions and these tools are made to undergo a travel of such extent that in the position at the end of the travel of each tool, the centre of the active surface of the latter is exactly at said distance $b$ which defines the final desired dimension. A strictly precise centering can thus be achieved.

In the case of a universal joint provided for operating at practically zero speed, for example for the steering column of an automobile vehicle, this centering is unnecessary and it is then sufficient to make the tools 21 acting on two opposed trunnions such as $1c$, $1d$ travel such distance that, at the end of the travel, the distance between the centres of the active surfaces of the two tools is equal to the desired value for the dimension $d$ between the centres of the bearing surfaces 13.

By giving the active surface of the tool 21 a concave shape instead of the convex shape shown in FIG. 7, the press A may be employed for dimensioning the convex end of the spigot 55 shown in FIGS. 5 and 6. This profile could also be planar.

The device shown in FIG. 7 could comprise, instead of projecting elements 21 for upsetting the material of the end faces of the trunnions toward the centre of the cross member, elements having a concave or hollowed-out centre portion suitable for forcing the material on the end face of the trunnions, also under the action of a cold upsetting, outwardly and forming projections which would constitute the bearing surfaces. In this case, the initial distance $a$ would be less than the final dimension $b$.

As mentioned hereinbefore, the invention is not intended to be limited to the utilisation of needle cups as shown in the drawings, it also being applicable to smooth bearings formed in the known manner.

Having now described my invention what I claim as new and desire to secure by Letters Patent is:

1. A process for producing an assembly of a cup on a metal trunnion of a universal joint cross member, which comprises forming said trunnion with the distance between the centre of said cross member and a centre region of the end face of the trunnion which differs from the value of the desired distance in the completed universal joint, engaging the end of said trunnion with a tool to effect a cold upsetting of the metal of said centre region to form at the centre of the end face of the trunnion a bearing surface which is at a distance from the centre of the cross member equal to said desired distance, forming a cup comprising an end wall having at its centre an axially offset portion defining a centre surface of the inner face of said end wall and assembling said cap on said trunnion with said centre surface of the cup bearing on said bearing surface of said trunnion, said bearing surface being formed as a depression in the end face of the trunnion and the end wall of said cup being formed with a central inward projection which seats in said depression.

2. A process according to claim 1, wherein said central inward projection of the cup is formed with a part-spherical shape.

3. A process according to claim 1, wherein said central inward projection of the cup is formed with a frusto-conical shape.

4. A process for producing an assembly of a cup on a metal trunnion of a universal joint cross member, which comprises forming said trunnion with the distance between the centre of said cross member and a center region of the end face of the trunnion which differs from the value of the desired distance in the completed universal joint, engaging the end of said trunnion with a tool to effect a cold upsetting of the metal of said centre region to form at the centre of the end face of the trunnion a bearing surface which is at a distance from the centre of the cross member equal to said desired distance, forming a cup comprising an end wall having at its centre an axially offset portion defining a centre surface on the inner face of said end wall and assembling said cap on said trunnion with said centre surface of the cup bearing on said bearing surface of said trunnion, said trunnion initially comprising a centre projection and said bearing surface being formed by said tool on the end of said projection, the end wall of said cup being formed with an inwardly facing depression in which said projection extends when said cup is assembled on said trunnion.

5. A process for producing an assembly of a cup on a metal trunnion with a resiliently yieldable washer between the cup and trunnion, which comprises forming said trunnion with the distance between the centre of said cross member and a centre region of the end face of the trunnion which differs from the value of the desired distance in the completed universal joint, engaging the end of said trunnion with a tool to effect a cold upsetting of the metal of said centre region to form at the centre of the end face of the trunnion a bearing surface which is at a distance from the centre of the cross member equal to said desired distance, forming a resiliently yieldable washer with a centre portion adapted to bear on said bearing surface on the end of the trunnion, forming a cup with a skirt portion and an end wall and assembling said washer and cup on said trunnion with said washer between the end face of the trunnion and the end wall of the cup and with said centre portion of the washer bearing on said bearing surface on the end of the trunnion, the centre portion of said washer being formed as a projection and said centre bearing surface being formed as a depression in the end face of the trunnion, said projection extending into said depression when the washer and cup are assembled on said trunnion.

6. A process according to claim 5, wherein said projection is formed in frusto-conical shape.

7. A process according to claim 5, wherein said projection is formed in part-spherical shape.

8. A process according to claim 5, wherein the end wall of said cup is formed with an annular portion and said washer is formed with an annular portion which surrounds said projection and which bears on said annular portion of the end wall of the cup when the washer and cup are assembled on the trunnion.

9. A process according to claim 5, wherein said cup is formed with a closed end constituted by said end wall and an open end opposite said closed end, and wherein said washer is formed with a diameter which exceeds the diameter of the trunnion and is less than the diameter of the open end of the cup.

10. A process for producing an assembly of a cup on a metal trunnion with a resiliently yieldable washer between the cup and trunnion, which comprises forming said trunnion with the distance between the centre of said cross member and a centre region of the end face of the trunnion which differs from the value of the desired distance in the completed universal joint, engaging the end of said trunnion with a tool to effect a cold upsetting of the metal of said centre region to form at the centre of the end face of the trunnion a bearing surface which is at a distance from the centre of the cross member equal to said desired distance, forming a resiliently yieldable washer with a centre portion adapted to bear on said bearing surface on the end of the trunnion, forming a cup with a skirt portion and an end wall and assembling said washer and cup on said trunnion with said washer between the end face of the trunnion and the end wall of the cup and with said centre portion of the washer bearing on said bearing surface on the end of the trunnion, said trunnion being initially formed with a centre projection on the end of the trunnion and said bearing surface being formed by said tool on the end of said projection, said washer being formed with a concave surface which bears on said bearing surface when the washer and cup are assembled on the trunnion.

* * * * *